United States Patent [19]

Ida

[11] 4,195,319
[45] Mar. 25, 1980

[54] APPARATUS FOR DETECTING INFORMATION INDEX SIGNAL FROM MAGNETIC TAPE

[75] Inventor: Masatoshi Ida, Hachioji, Japan

[73] Assignee: Olympus Optical Co., Ltd., Japan

[21] Appl. No.: 972,808

[22] Filed: Dec. 26, 1978

[30] Foreign Application Priority Data

Jan. 12, 1978 [JP] Japan ................................. 53/2459

[51] Int. Cl.² ............................................ G11B 15/43
[52] U.S. Cl. ................................. 360/72.1; 360/72.3
[58] Field of Search ........................... 360/72.1, 72.3

[56] References Cited

U.S. PATENT DOCUMENTS

| 3,609,251 | 9/1971 | Ban ....................... 360/72.1 |
| 3,723,666 | 3/1973 | Ferrari ..................... 360/72.1 |
| 3,893,177 | 7/1975 | Takenaka .................. 360/72.1 |

*Primary Examiner*—Robert S. Tupper
*Attorney, Agent, or Firm*—Lerner, David, Littenberg & Samuel

[57] ABSTRACT

An apparatus for detecting information index signal from magnetic tape comprises a tape take-up shaft driven for rotation at a uniform rate during a tape rewind or rapid advance to take up the magnetic tape on which a plurality of information items are recorded, a first pulse generator responsive to the rotation of the take-up shaft to produce reference pulses, a second pulse generator responsive to the rotation of a tape supply shaft which rotates as the tape runs to produce pulses at a rate which depends on the varying tape speed, a logic circuit for converting a ratio of the number of pulses generated per unit time by the pulse generators into a voltage value, a detecting head for detecting a signal-free area between adjacent information items recorded on the magnetic tape, a pulse counter for counting clock pulses during the time the signal-free area is being detected, and a comparator for converting the number of clock pulses counted into a corresponding voltage value and for producing a count signal for information retrieval upon coincidence between the both voltage values.

5 Claims, 5 Drawing Figures

APPARATUS FOR DETECTING INFORMATION INDEX SIGNAL FROM MAGNETIC TAPE

BACKGROUND OF THE INVENTION

The invention relates to an apparatus for detecting information index signal from a magnetically recorded tape, and more particularly, to such apparatus which may be utilized to achieve an automatic retrieval of a desired one of information blocks contained in a magnetically recorded tape.

A magnetic tape such as music tape, data containing tape or the like which contains a plurality of information items may be loaded on a tape recorder to select a desired one of information items in an automatic manner for reproduction thereof. At this end, the tape is usually run at a higher rate by establishing a rapid advance or rewind mode of the tape recorder in order to detect information index signals recorded in the tape until the count of signals detected reaches a preset value, whereupon the tape recorder is automatically set to a playback mode for reproduction of the desired information item.

An area of the tape which is located between adjacent information items and thus is free from any signal may be utilized as information index signal. In a music tape, for example, wherein a plurality of popular musical pieces playing for a period on the order of three minutes are recorded, such signal-free area is provided between adjacent musical pieces and hence can be utilized as information index signal during the rapid advance or rewind operation of the tape. To detect such signal-free area, a detecting head may be brought into abutment against the tape during the rapid advance or rewind mode of the tape. A desired information item can be located by comparing the position in time of a selected signal-free area against a given position in time of a desired information item.

The described apparatus of comparing the time when a selected signal-free area is detected against a given time involves a difficulty in that the intended position in time of a desired information item does not vary linearly with the length of the tape inasmuch as the tape feed rate is not uniform during a rapid advance or rewind mode, but rather the tape take-up shaft which is directly driven causes the tape to run at an increasingly higher rate, resulting in a varying tape running speed with a change in the diameter of the roll of the tape portion disposed on the take-up shaft.

Another difficulty results from the fact that during the time the tape is run at a higher rate, the tape speed undergoes an inconspicuous change, which prevents a positive contact between the tape and the detecting head from being expected. As a consequence, a skip-over occurs, which means a momentary disengagement of the tape from the head surface. In response to a skip-over, the head will produce an output signal which would indicate the occurrence of a signal-free area in the tape, causing a false counting as one of information index signals. A further difficulty occurs with a musical tape in that where a musical piece includes silent portion, it may be detected as a signal-free area between adjacent musical pieces, again causing a false counting.

These disadvantages can be overcome by providing an increased length of signal-free space between adjacent information items and establishing an increased length of time as the threshold for a signal-free area to be detected as such during the rewind or rapid advance of the tape, thus assuring a reliable detection of true signal-free areas. However, when the tape is thus constructed, the tape utilization efficiency is degraded, and the tape being played will be less pleasing and wearisome to a user.

SUMMARY OF THE INVENTION

It is an object of the invention to eliminate above disadvantages of the prior art by providing an apparatus for detecting information index signal from a magnetically recorded tape which comprises a first pulse generator for producing a reference pulse signal in response to the rotation of a tape take-up shaft and a second pulse generator responsive to the rotation of a tape supply shaft for producing a pulse signal which varies with a tape speed, thus allowing a change in the tape running speed to be detected continuously and wherein counter means is provided to convert an output from a detecting head representing a signal-free area into a number of clock pulses, which is then converted into a voltage level in order to assure a reliable detection of signal-free areas.

In the apparatus of the invention, the number of pulses generated per unit time by both pulse generators is counted, and the ratio of these numbers is converted into a continuous voltage level which depends on the varying tape running speed. The length of signal-free area detected by the head is converted into a number of clock pulses, which is then converted into a voltage level. An information index signal is outputted upon coincidence between the both voltage levels. This arrangement avoids the need to calculate a given time when a desired information item appears, in accordance with a change in the tape running speed, and also prevents a silent portion of a musical piece or a tape skip-over from being detected as an effective signal-free area unless it has a given duration corresponding to a changing tape speed, thus preventing a false counting. In this manner, the invention enables a signal-free area of a magnetically recorded tape to be reliably detected under any running condition of the tape during the rapid advance or rewind mode.

DESCRIPTION OF PREFERRED EMBODIMENT

Figure 1:
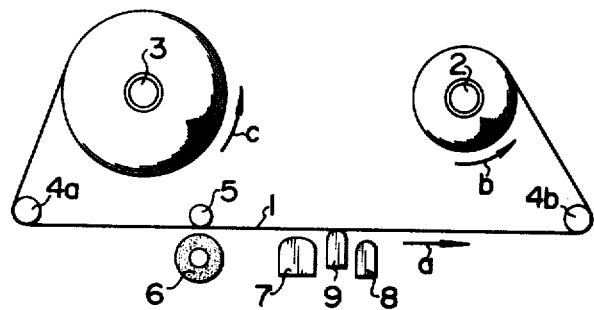
FIG. 1 is a schematic plan view of a tape recorder illustrating the detection of a signal-free area of a magnetic tape by a detecting head during the rewind mode.
Figure 3:
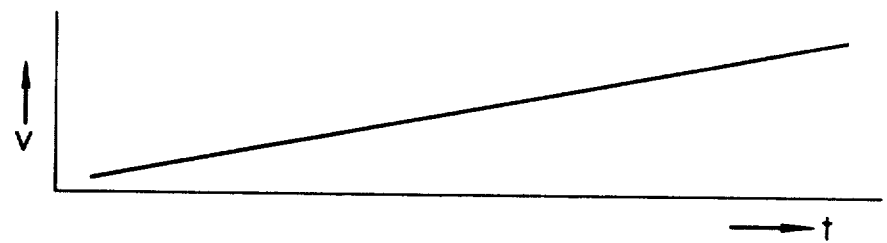
FIG. 3 graphically shows a change in the tape running speed with time during the rapid advance or rewind operation of the tape.

Referring to FIG. 1, there is shown a magnetic tape 1 in which a plurality of information items are recorded. During the rewind mode, a tape take-up shaft 2 is directly driven by a drive mechanism, not shown, to rotate counter-clockwise as indicated by an arrow b, thus winding the tape at a high rate as it is reeled off a tape supply shaft 3 and passed around guide pins 4a, 4b. As is well recognized, the tape 1 is fed at uniform rate in a direction opposite to that indicated by an arrow a during a record or playback mode, by a combination of capstan 5 and pinch roller 6. A magnetic record/playback head 7 and erase head 8 may be brought into abutment against that portion of magnetic tape which extends across guide pins 4a, 4b in order to perform a record or playback operation. However, during the tape rewind, the pinch roller 6 and heads 7, 8 are moved away from such tape span, and the tape take-up shaft 2 is directly driven to rotate counter-clockwise, thus running tape 1 in the direction of the arrow a at a higher rate. The tape is reeled off the supply shaft 3 and is wound around the take-up shaft 2. During such tape rewind, the shaft 3 rotates in a direction indicated by an arrow c as the tape is taken up on the shaft 2. Consequently, the rotational speed of the shaft 3 as well as the tape running speed increases as the diameter of the tape roll on the shaft 2 increases. This is illustrated in FIG. 3 where it will be noted that the rotational speed and the tape speed gradually increase with time t. By way of example, the shaft 3 will undergo one-half revolution during the time the shaft 2 completes one revolution thereof at the beginning of the tape rewind process while toward the end of the tape rewind, it will rotate at a higher rate, undergoing two revolutions for one revolution of the tape take-up shaft 2. In accordance with the invention, a detecting head 9 is brought into abutment against the tape 1 during the rewind mode in order to detect a signal-free area contained in the tape 1. As shown, the head 9 is maintained in abutment against the tape span running across the guide pins 4a, 4b.

In the description to follow, the operation of the invention will be described when detecting signal-free areas during the tape rewind. However, it should be noted that when it is desired to detect such areas during the rapid advance of the tape, the shaft 3 serves as a tape take-up shaft while the shaft 2 serves as a tape supply shaft, and the direction of rotation as well as the direction of tape running will be reversed. In addition, the first and second pulse generators, to be described later, are interchanged in function. However, the general arrangement and operation remain unchanged, and therefore the detection of signal-free areas during the rapid tape advance will not be described.

Figure 2:
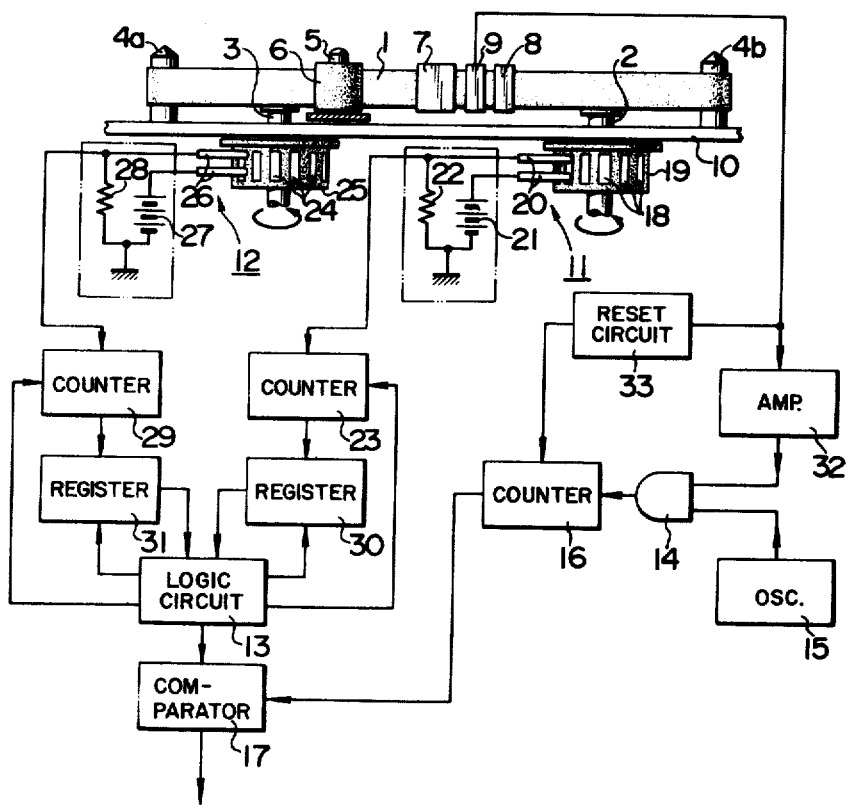
FIG. 2 is a side elevation of the apparatus for detecting signal-free area of the tape in accordance with one embodiment of the invention, together with a block diagram of the circuit arrangement.

Referring to FIG. 2, the apparatus for detecting information index signal according to the invention comprises first pulse generator 11 which is responsive to the rotation of tape take-up shaft 2 to produce reference pulses, second pulse generator 12 responsive to the rotation of the tape supply shaft 3 to produce pulse signals in accordance with a change in the speed of the shaft 3, means for counting the number of pulses generated by the both pulse generators 11, 12 per unit time, logic circuit 13 for converting the ratio of the number of pulses counted into a continuous voltage level, the detecting head 9 which detects signal-free areas between adjacent information items recorded on the magnetic tape 1, a clock pulse oscillator 15 for producing clock pulses, AND gate 14 which is controlled by the head 9 to apply clock pulses to a pulse counter 16, and a comparator 17 which receives the clock pulses from the pulse counter 16 and also receives an output of the logic circuit 13 for producing a count output for retrieval of information item.

Figure 4:
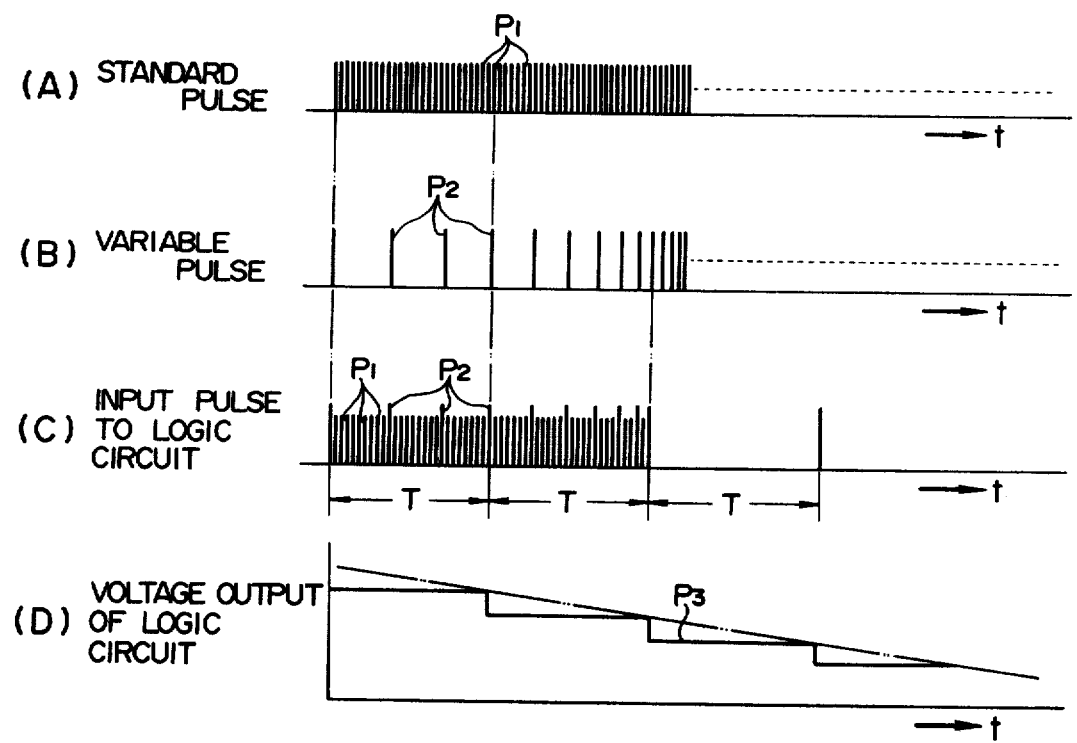
FIGS. 4(A) to (D) are timing diagrams illustrating the outputs of the first and second pulse generators and a logical circuit.

Referring to FIG. 2, it will be noted that both shafts 2, 3 extend through a stationary baseplate 10 of the tape recorder and are rotatably supported by the latter. The first pulse generator 11 comprises a cylindrical body 19 which is integrally secured to the shaft 2 and carrying a plurality of conductive segments 18 which are disposed on the outer peripheral surface thereof at an equal interval, a pair of sliding brushes 20 simultaneously engaging one of the conductive segments 18, and a power supply 21 and resistor 22 connected in series across the pair of brushes 20. As the shaft 2 is driven for rotation at a uniform high rate, brushes 20 are periodically shortcircuited by successive conductive segments 18, thus producing a series of regularly spaced reference pulse signals $P_1$, as shown in FIG. 4(A). These reference pulse signals are applied to a first pulse counter 23 which counts them.

The second pulse generator 12 comprises a cylindrical body 25 which is integrally secured to the tape supply shaft 3 and carrying a plurality of conductive segments 24 which are disposed on the outer peripheral surface thereof at an equal interval, a pair of sliding brushes 26 simultaneously engaging one of the conductive segments 24, and a power supply 27 and resistor 28 connected in series across the pair of brushes. As the tape supply shaft 3 rotates in following relationship with the tape running, the pair of sliding brushes 26 are periodically shortcircuited by successive conductive segments 25, thereby producing pulse signals $P_2$ across the resistor 28. As shown in FIG. 4(B), there is an increased time interval between adjacent pulse signals $P_2$ initially, but as the tape speed increases, the time interval between adjacent pulse signals $P_2$ progressively decreases. The varying time interval is a direct result of the fact that the tape speed as well as the rotational speed of the shaft 3 increases as the diameter of the tape roll on the take-up shaft increases. Pulse signals $P_2$ are applied to a second pulse counter 29 which operates to count the number of pulses applied per unit time.

The both counters 23 and 29 are synchronized by a count command produced by the logic circuit 13, and operate to count the number of pulses applied per unit time T which may be on the order of 0.5 to 1 second, for example. The respective count outputs are fed to first and second registers 30, 31, respectively. Both registers hold the respective counts for a duration corresponding to the unit time T, and then supply them to the logic circuit 13 in a synchronized manner. It is to be noted that a synchronization command is produced by the logic circuit 13 and is applied to both registers 30, 31.

The logic circuit 13 is supplied with a count representing the number of reference pulses $P_1$ which are fixed in number per unit time T as well as a count representing the number of pulses $P_2$ which vary in number per unit time T in accordance with a change in the tape speed or in the rotational speed of the shaft 3. FIG. 4(C) depicts those pulses from generators 11, 12 which contribute to the respective counts. The logic circuit 13 calculates a ratio of the number of both pulses and converts it into a continuous voltage output $P_3$ (see FIG. 4(D)), which is applied to the comparator 17. It will be noted that the magnitude of the voltage output $P_3$ corresponds to a change in the tape running speed.

The head 9 has its output connected with an amplifier 32 which produces an output signal only in response to the absence of its input signal, and also with a reset circuit 33. The output of the amplifier 32 is connected with one input of AND gate 14, the other input of which is fed from the clock pulse oscillator 15. Thus AND gate 14 is enabled only when it receives an output signal from the amplifier 32 to pass clock pulses, which are counted by the pulse counter 16. When the head 9 detects a signal, the reset circuit 33 operates to reset the counter 16. The count output of the pulse counter 16 is fed to the comparator 17, which converts it into a voltage value, which is in turn compared against the voltage value $P_3$ from the logic circuit 13. The comparator 17 produces a count output which is used for purpose of information retrieval, only when coincidence is reached between the both voltage values.

In operation, when a tape rewind is initiated and both shafts 2, 3 rotate, the first pulse generator 11 produces reference pulses $P_1$ as shown in FIG. 4(A) while the second pulse generator 12 produces pulses $P_2$ as shown in FIG. 4(B). The number of both pulses produced per unit time T is counted by respective pulse counters 23, 29, which synchronously feed first and second registers 30, 31. The both registers 30, 31 hold the respective counts of pulses $P_1$, $P_2$ for a duration corresponding to unit time T and then feed them to the logic circuit 13, which converts the ratio of the number of both pulses into a voltage value $P_3$, which is then applied to the comparator 17.

Figure 5:
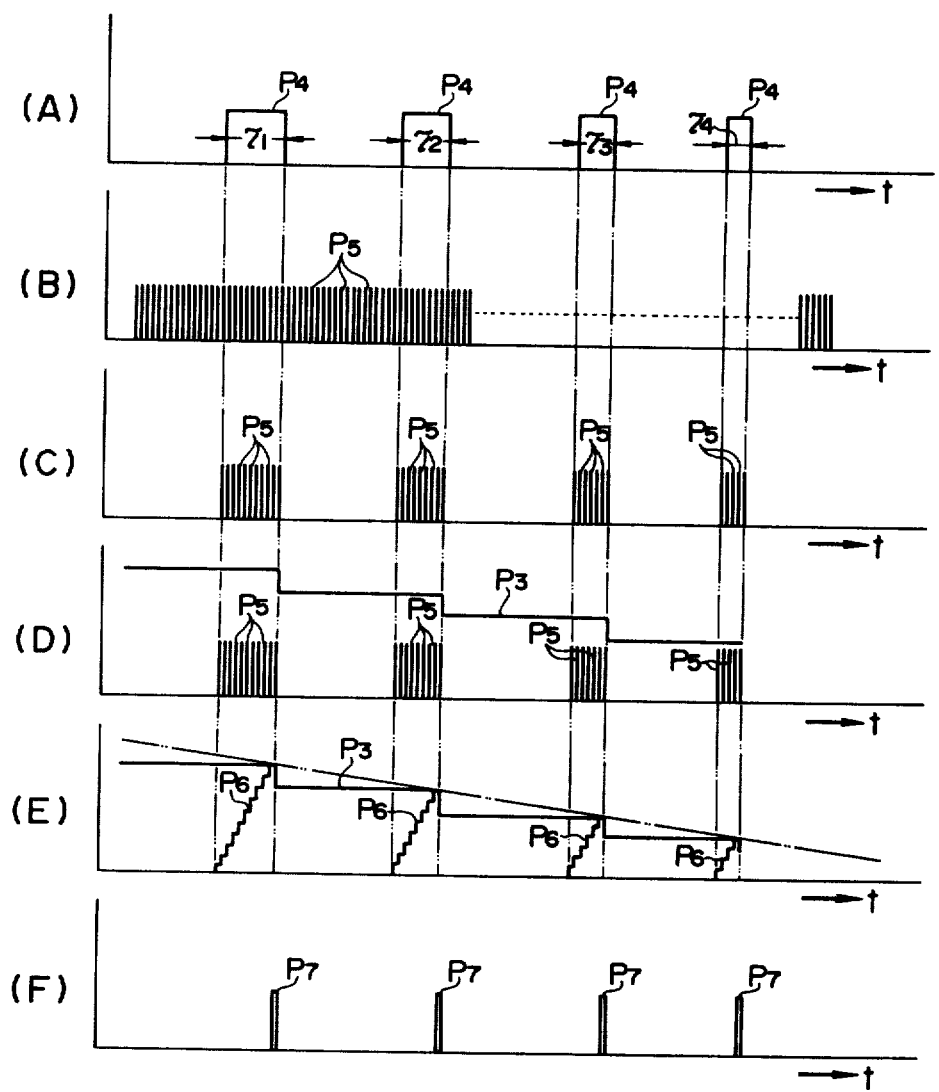
FIGS. 5(A) to (F) are timing diagrams showing the outputs of detecting head, clock pulse oscillator, AND gate, pulse counter and comparator.

On the other hand, each time a signal-free area in the tape 1 is detected by the head 9, amplifier 32 produces a detection signal $P_4$ shown in FIG. 5(A) which is applied to AND gate 14. The detection signal $P_4$ will be of a uniform duration during the playback of the tape. However, during the tape rewind or rapid advance, the varying or increasing tape speed will cause the duration $\tau$ of successive detection signals $P_4$ to be reduced in a manner inversely proportional to the tape speed. As mentioned previously, AND gate 14 is enabled only when the detection signal $P_4$ is applied thereto, or in other words, for the duration $\tau$ of the detection signal. As shown in FIG. 5(B), clock pulse generator 15 produces clock pulses $P_5$ at a regular interval. Hence, only those clock pulses $P_5$ which are produced during the duration of the detection signal $P_4$ will pass through AND gate 14. Thus, the greater the duration of the detection signal $P_4$, the more the number of clock pulses which are passed, or vice versa.

These clock pulses $P_5$ are counted by the clock pulse counter 16, and their count is applied to the comparator 17. As shown in FIG. 5(D), the count of clock pulses $P_5$ and the voltage value $P_3$ from the logic circuit 13 are applied to the comparator 17. The comparator 17 converts the number of clock pulses applied into an analog voltage $P_6$, as illustrated in FIG. 5(E), and compares it against the voltage value $P_3$. When the voltage value $P_6$ coincides with the voltage value $P_3$, it produces a count signal $P_7$ shown in FIG. 5(F) for purpose of information retrieval. In this manner, a count signal which is utilized for purpose of information retrieval can be reliably produced in response to a signal-free area between adjacent information items which has a varying duration as the tape speed varies. When a skip-over of the tape occurs and the head 9 detects it as a signal-free area or when a silent portion of a musical piece is detected by the head 9 as a signal-free area, the duration of such detection signal will not correspond to the tape speed, so that when it is converted into voltage value in the comparator 17 for comparison with the output voltage from the logic circuit 13, no coincidence can be reached. Hence the comparator 17 will not produce a count signal $P_7$, thus avoiding a false counting as a result of a tape skip-over.

It should be understood that the record/playback head 7 may be used as the detecting head 9.

What is claimed is:

1. An apparatus for generating a count signal from a magnetic tape comprising a tape take-up shaft adapted to be driven for rotation at a uniform rate during a rapid advance or rewind of the tape for taking up the magnetic tape in which a plurality of information items are recorded, a first pulse generator responsive to the rotation of the tape take-up shaft to produce a reference pulse signal, a tape supply shaft adapted to rotate as the tape is taken up on the take-up shaft with a rotational speed which increases with an increasing diameter of tape roll on the take-up shaft, a second pulse generator responsive to the rotation of the tape supply shaft to produce a pulse signal at a rate which depends on the varying speed of the supply shaft, means for counting the number of pulses produced per unit time by the first and second pulse generators, a logic circuit for converting a ratio of the number of both pulses into a continuous voltage value which is proportional to the varying tape speed, a detecting head for detecting a signal-free area between adjacent information items recorded on the magnetic tape, an AND gate enabled by a detection signal from the detecting head for passing clock pulses from a clock pulse generator, a pulse counter for receiving clock pulses from the AND gate, and a comparator receiving the count output from the pulse counter and a voltage value from the logic circuit and converting the count output into a corresponding voltage value, the comparator producing a count signal for information retrieval only upon coincidence between the both voltage values.

2. An apparatus according to claim 1 in which the first pulse generator comprises a cylindrical body secured to the tape take-up shaft and carrying a plurality of conductive segments disposed on its outer peripheral surface at an equal interval, a pair of sliding brushes simultaneously engaging one of the conductive segments, and a power supply and resistor connected in series across the pair of brushes.

3. An apparatus according to claim 1 in which the second pulse generator comprises a cylindrical body secured to the tape supply shaft and carrying a plurality of conductive segments disposed on its outer peripheral surface at an equal interval, a pair of sliding brushes simultaneously engaging one of the conductive segments, and a power supply and resistor connected in series across the pair of brushes.

4. An apparatus according to claim 1 in which said means for counting the pulses comprises a pulse counter for counting pulses generated per unit time by the first pulse generator, a register for holding the count of pulses for a unit time, another pulse counter for counting pulses generated per unit time by the second pulse generator, and another register for holding the count of pulses from the second generator for a unit time, the counts contained in the both registers being fed to the logic circuit in synchronized relationship.

5. An apparatus according to claim 1 in which the detection signal from the detecting head is amplified by an amplifier before it is applied to the AND gate.

* * * * *